(12) United States Patent
Min et al.

(10) Patent No.: US 11,383,765 B2
(45) Date of Patent: Jul. 12, 2022

(54) SIDE SILL STRUCTURE FOR VEHICLE

(71) Applicants: Hyundai Motor Company, Seoul (KR); Kia Motors Corporation, Seoul (KR)

(72) Inventors: Huen Sick Min, Gyeonggi-do (KR); Se Woong Jung, Seoul (KR); Dae Su Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/086,891

(22) Filed: Nov. 2, 2020

(65) Prior Publication Data

US 2022/0017149 A1 Jan. 20, 2022

(30) Foreign Application Priority Data

Jul. 15, 2020 (KR) .......................... 10-2020-0087798

(51) Int. Cl.
*B62D 25/02* (2006.01)
*B62D 25/16* (2006.01)
*B62D 21/15* (2006.01)

(52) U.S. Cl.
CPC ........... *B62D 25/025* (2013.01); *B62D 25/16* (2013.01); *B62D 21/157* (2013.01)

(58) Field of Classification Search
CPC .................................................. B62D 25/025
USPC ......................................................... 296/209
See application file for complete search history.

(56) References Cited

FOREIGN PATENT DOCUMENTS

| JP | 2007131264 A | * | 5/2007 |
| JP | 2012135977 A | * | 7/2012 |
| JP | 5092777 B2 | * | 12/2012 |

* cited by examiner

*Primary Examiner* — Dennis H Pedder
(74) *Attorney, Agent, or Firm* — Fox Rothschild LLP

(57) ABSTRACT

A side sill structure for a vehicle includes: a side sill connected to a floor of the vehicle, and extending in a longitudinal direction of the vehicle; and a rear wheel house connected to a rear end of the side sill. The side sill includes an outer side sill facing an exterior of the vehicle, an inner side sill facing an interior of the vehicle, and a reinforcement disposed between the outer side sill and the inner side sill. The reinforcement extends from a front of the vehicle to the rear wheel house, and a cross-section of the reinforcement is unchanged along a longitudinal direction of the reinforcement.

10 Claims, 4 Drawing Sheets

SIDE SILL STRUCTURE FOR VEHICLE

CROSS-REFERENCE TO RELATED APPLICATION

This application claims under 35 U.S.C. § 119(a) the benefit of Korean Patent Application No. 10-2020-0087798, filed on Jul. 15, 2020 in the Korean Intellectual Property Office, the entire contents of which are incorporated by reference herein.

BACKGROUND

(a) Technical Field

The present disclosure relates to a side sill structure for a vehicle, more particularly, to the side sill structure capable of evenly distributing a load in the event of a side impact of the vehicle, in order to reduce deformation such as torsion.

(b) Description of the Related Art

A vehicle includes a pair of side sills disposed on left and right sides of a floor, respectively. The pair of side sills may serve to protect a passenger compartment from side impacts, frontal impacts, etc. of the vehicle. A center pillar may be connected to a central portion of each side sill, and a rear end of each side sill may be connected to a rear wheel house through a reinforcing member.

In a conventional side sill structure, in order to match the rear end of the side sill with the reinforcing member, their respective shapes may change rapidly, and their materials and thicknesses may be different, resulting in reduced connection stiffness between the side sill, a rear floor, and the reinforcing member. In the event of a side impact of the vehicle, the rear end of the side sill and the reinforcing member may be plastically deformed. A load in the initial stage of the impact may not be transferred evenly to the rear floor, so excessive torsion of the side sill may occur, resulting in excessive deformation of the center pillar.

The above information described in this background section is provided to assist in understanding the background of the inventive concept, and may include any technical concept which is not considered as the prior art that is already known to those skilled in the art.

SUMMARY

An aspect of the present disclosure provides a side sill structure for a vehicle capable of increasing stiffness of a side sill, in order to reduce a deformation caused by an impact load such as a torsional load, and for distributing the impact load in the event of a side impact of the vehicle.

According to an aspect of the present disclosure, a side sill structure for a vehicle may include: a side sill connected to a floor of the vehicle, and extending in a longitudinal direction of the vehicle; and a rear wheel house connected to a rear end of the side sill. The side sill may include an outer side sill facing an exterior of the vehicle, an inner side sill facing an interior of the vehicle, and a reinforcement disposed between the outer side sill and the inner side sill. The reinforcement may extend from a front of the vehicle to the rear wheel house, and a cross-section of the reinforcement may be unchanged along a longitudinal direction of the reinforcement.

The side sill structure may further include an inboard-side rear reinforcing member joined to a rear end of the inner side sill, and the reinforcement may be joined to the inner side sill and the inboard-side rear reinforcing member.

The inner side sill and the inboard-side rear reinforcing member may be joined to an edge of the floor.

The side sill structure may further include a floor side member joined to an inboard surface of the inboard-side rear reinforcing member, and the floor side member may be disposed under the floor.

The rear wheel house may have a wheel house extension portion to which the rear end of the side sill is joined, the wheel house extension portion may be provided with a connection member having a shape matching that of a rear end of the reinforcement, and the rear end of the reinforcement may be joined to the connection member.

The side sill structure may further include an insert reinforcing member inserted into the rear end of the reinforcement.

The insert reinforcing member may be joined to the connection member through a structural adhesive.

The reinforcement may have a top flange joined to the inner side sill and the inboard-side rear reinforcing member and a rear flange located behind the top flange, and the rear flange may be spaced apart from the connection member.

The side sill structure may further include an outboard-side rear reinforcing member joined to a rear portion of the reinforcement. The outboard-side rear reinforcing member may protrude from the reinforcement toward the exterior of the vehicle, and the outboard-side rear reinforcing member may be connected to a rear portion of the outer side sill and the wheel house extension portion.

The reinforcement may have a bottom flange joined to the inner side sill and the inboard-side rear reinforcing member, and the outboard-side rear reinforcing member may have a bottom flange joined to the bottom flange of the reinforcement.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
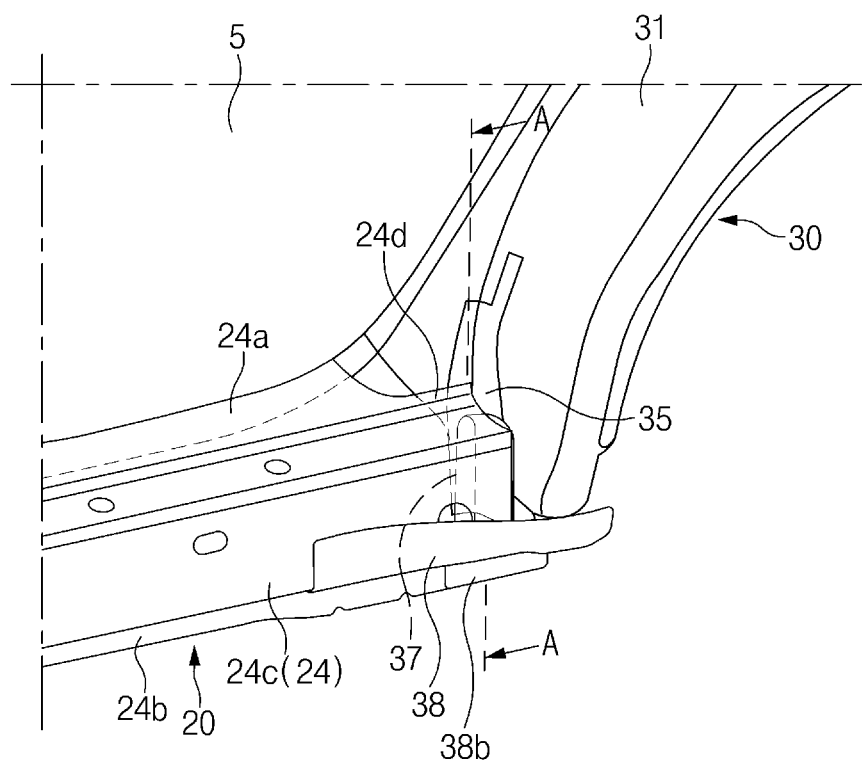
FIG. 1 illustrates a perspective view of a side sill structure for a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
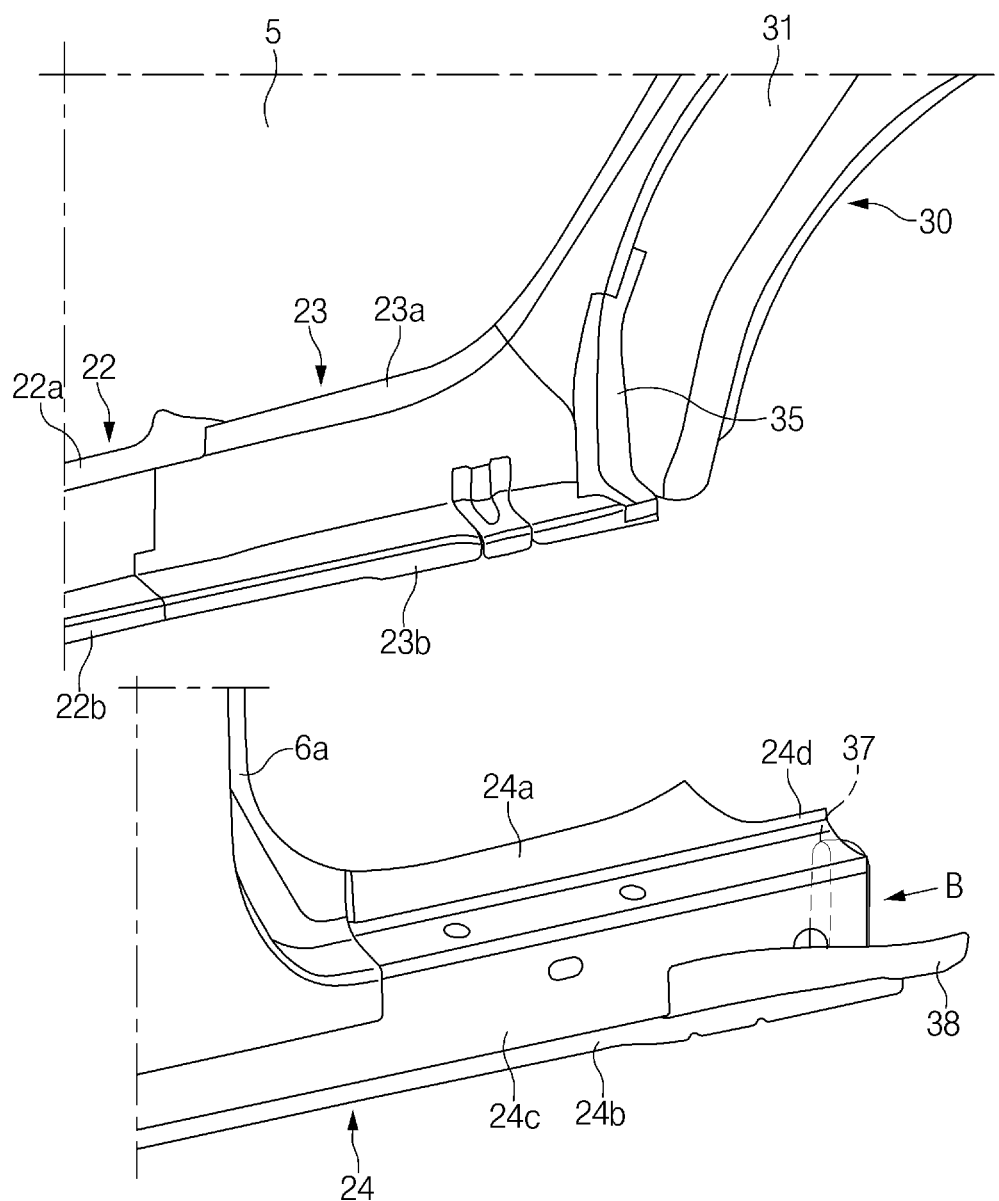
FIG. 2 illustrates an exploded perspective view of the side sill structure for a vehicle illustrated in FIG. 1.
Figure 3:
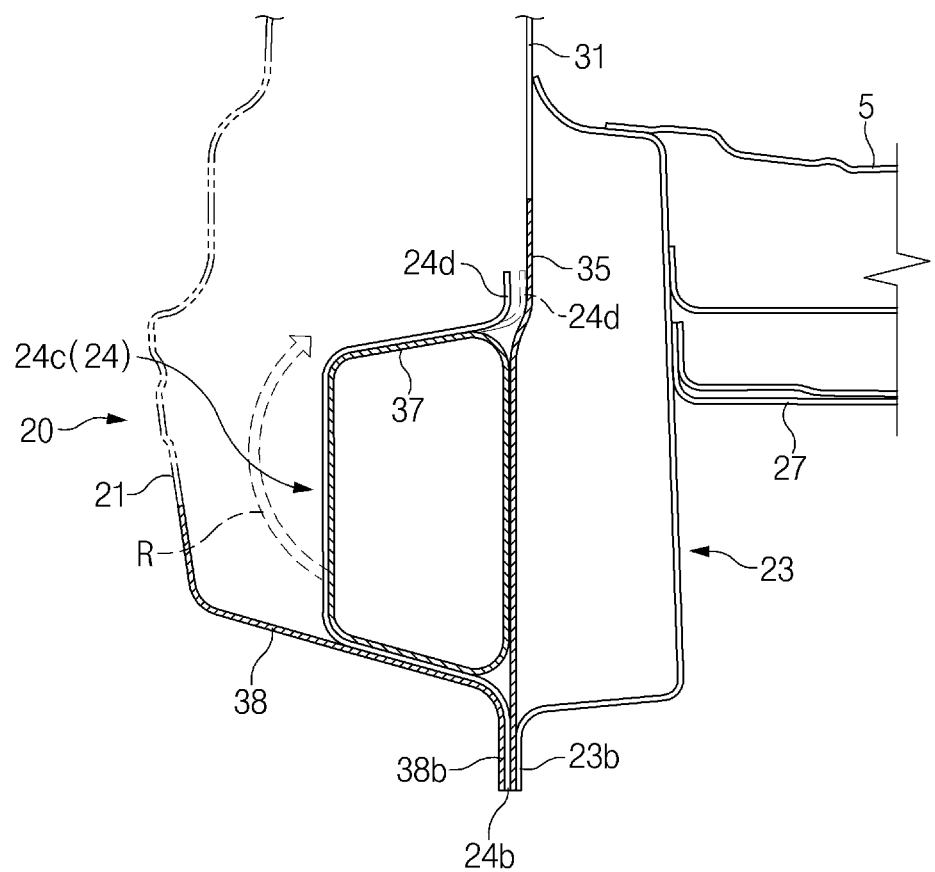
FIG. 3 illustrates a cross-sectional view, taken along line A-A of FIG. 1.

Referring to FIGS. 1 to 3, a side sill structure 10 for a vehicle according to an exemplary embodiment of the present disclosure may include a side sill 20 connected to a floor 5 of the vehicle, and a rear wheel house 30 connected to a rear end of the side sill 20.

The vehicle may include a pair of side sills 20 (where each of the side sills 20 is the same) disposed on both edges of the floor 5, and each side sill 20 may extend in a longitudinal direction of the vehicle. As illustrated in FIG. 1, a left side sill may be connected to the left side edge of the floor 5, and a right side sill (not shown) may be connected to the right side edge of the floor 5. The floor 5 may include a center floor panel and a rear floor panel connected to a rear end of the center floor panel.

Referring to FIGS. 1 to 3, the side sill 20 may include an outer side sill 21 facing an exterior of the vehicle and an inner side sill 22 facing an interior of the vehicle. The outer side sill 21 and the inner side sill 22 may extend along the edge of the floor 5, and the inner side sill 22 may be shorter than the outer side sill 21.

A reinforcement 24 may be disposed between the outer side sill 21 and the inner side sill 22, and the reinforcement 24 may be joined to the outer side sill 21 and/or the inner side sill 22. The reinforcement 24 may extend in a longitudinal direction of the outer side sill 21 and a longitudinal direction of the inner side sill 22, and a cross-section of the reinforcement 24 may be kept the same or similar (i.e., unchanged) along a longitudinal direction of the reinforcement 24. A length of the reinforcement 24 may be less than or equal to that of the outer side sill 21.

Referring to FIG. 2, the inner side sill 22 may have a top flange 22a and a bottom flange 22b. The top flange 22a may be formed on a top portion of the inner side sill 22, and the bottom flange 22b may be formed on a bottom portion of the inner side sill 22. An inboard-side rear reinforcing member 23 may be joined to a rear end of the inner side sill 22 by welding, using fasteners, and/or the like, and the inboard-side rear reinforcing member 23 may extend from the inner side sill 22 toward the rear of the vehicle in the longitudinal direction of the vehicle. The inner side sill 22 and the inboard-side rear reinforcing member 23 may be continuous along the longitudinal direction of the vehicle. The inboard-side rear reinforcing member 23 together with the inner side sill 22 may be disposed to face the interior of the vehicle. A rear end of the inboard-side rear reinforcing member 23 may be joined to the rear wheel house 30 by welding, using fasteners, and/or the like. The inboard-side rear reinforcing member 23 and the inner side sill 22 may be continuously connected to the rear wheel house 30 along the longitudinal direction of the vehicle.

The inboard-side rear reinforcing member 23 may have a top flange 23a and a bottom flange 23b. The top flange 23a may be formed on a top portion of the inboard-side rear reinforcing member 23, and the bottom flange 23b may be formed on a bottom portion of the inboard-side rear reinforcing member 23. The sum of a length of the inner side sill 22 and a length of the inboard-side rear reinforcing member 23 may be the same as or similar to the length of the outer side sill 21, and thus the outer side sill 21 may entirely cover the inner side sill 22 and the inboard-side rear reinforcing member 23.

Referring to FIG. 3, the inboard-side rear reinforcing member 23 may be joined to the side edge of the floor 5 by welding, using fasteners, and/or the like. Specifically, the inboard-side rear reinforcing member 23 may be joined to the side edge of the rear floor panel of the floor 5. In addition, the inner side sill 22 may be joined to the side edge of the floor 5 by welding, using fasteners, and/or the like. Specifically, the inner side sill 22 may be joined to the side edge of the center floor panel of the floor 5.

A floor side member 27 may be joined to an inboard surface of the inboard-side rear reinforcing member 23 by welding, using fasteners, and/or the like, and the floor side member 27 may be disposed under the floor 5.

The reinforcement 24 may be joined to the inner side sill 22 and the inboard-side rear reinforcing member 23 by welding, using fasteners, and/or the like, and the reinforcement 24 may be disposed outward from the inner side sill 22 and the inboard-side rear reinforcing member 23. Referring to FIGS. 2 and 3, a rear portion 24c of the reinforcement 24 may be disposed between the inboard-side rear reinforcing member 23 and a rear portion of the outer side sill 21.

According to an exemplary embodiment, the length of the reinforcement 24 may be the same as or similar to the length of the outer side sill 21.

According to an exemplary embodiment, the reinforcement 24 may extend from a front end of the outer side sill or a front pillar (not shown) to a wheel house extension portion 31 of the rear wheel house 30. Thus, the rear portion 24c of the reinforcement 24 may be directly joined to the rear wheel house 30.

According to an exemplary embodiment, the reinforcement 24 and the outer side sill 21 may have the same length as that of the side edge of the floor 5.

Referring to FIG. 2, the reinforcement 24 may have a top flange 24a and a bottom flange 24b. The top flange 24a may be formed on a top portion of the reinforcement 24, and the bottom flange 24b may be formed on a bottom portion of the reinforcement 24. The top flange 24a of the reinforcement 24 may be joined to the top flange 22a of the inner side sill 22 and the top flange 23a of the inboard-side rear reinforcing member 23 by welding using fasteners, and/or the like. The bottom flange 24b of the reinforcement 24 may be joined to the bottom flange 22b of the inner side sill 22 and the bottom flange 23b of the inboard-side rear reinforcing member 23 by welding, using fasteners, and/or the like.

The rear portion 24c of the reinforcement 24 may have a rear flange 24d, and the rear flange 24d may be located behind the top flange 24a. Referring to FIG. 3, the rear flange 24d may be spaced apart from a connection member 35 and the wheel house extension portion 31. That is, the rear flange 24d may not be joined to the connection member 35 and the wheel house extension portion 31. When the rear portion 24c of the reinforcement 24 pivots by a torsional load acting in the event of a side impact of the vehicle (see direction indicated by arrow R in FIG. 3), the rear flange 24d may come into contact with the connection member 35 and the wheel house extension portion 31 and be stopped (see dotted line in FIG. 3), and thus a deformation of the reinforcement 24 caused by the torsional load may be suppressed. A reinforcing member 6a of the center pillar may be joined to the reinforcement 24.

The rear wheel house 30 may have the wheel house extension portion 31 to which the rear end of the side sill 20 is directly joined. The wheel house extension portion 31 may be formed on a lower end portion of a front portion of the rear wheel house 30. The wheel house extension portion 31 may have the connection member 35, and the connection member 35 and the wheel house extension portion 31 may be joined by welding, using fasteners, and/or the like. The connection member 35 may be made of a material having high stiffness which is the same as that of the rear wheel house 30 or is higher than that of the rear wheel house 30. The connection member 35 may have a shape matching that of the rear end of the inboard-side rear reinforcing member 23 and the rear end of the reinforcement 24, and thus the rear end of the inboard-side rear reinforcing member 23 and the rear end of the reinforcement 24 may be joined to the connection member 35 by welding using fasteners, and/or the like.

Figure 4:
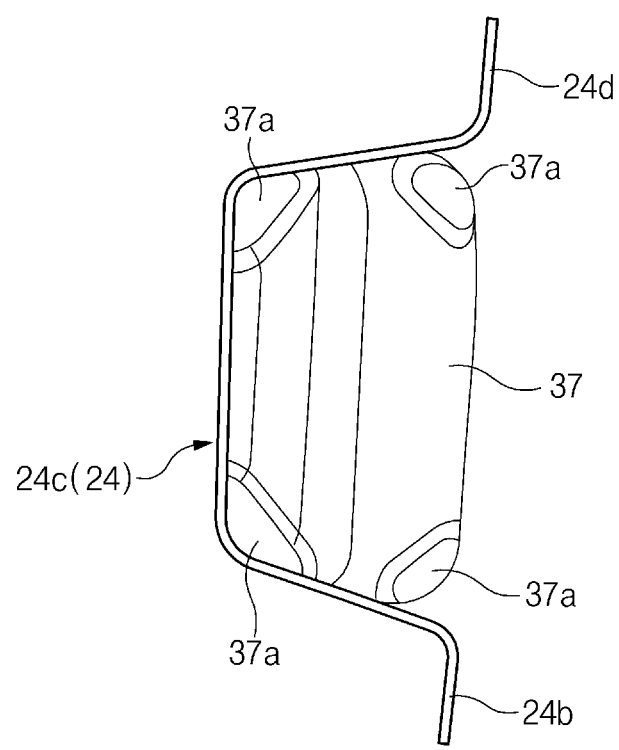
FIG. 4 illustrates a view of an insert reinforcing member and a reinforcement, viewed from a direction indicated by arrow B of FIG. 2.

Referring to FIGS. 1 to 3, the reinforcement 24 may have a cavity which is open to the interior of the vehicle, and an insert reinforcing member 37 may be inserted and joined to the rear end of the reinforcement 24. Referring to FIG. 4, the insert reinforcing member 37 may have a shape that matches the cavity of the reinforcement 24, and thus the insert reinforcing member 37 may be tightly joined to an interior surface of the reinforcement 24. The insert reinforcing member 37 may have a plurality of openings 37a provided in corner portions thereof, respectively. The insert reinforcing member 37 may be joined to the connection member 35 of the wheel house extension portion 31 using a structural adhesive. As the insert reinforcing member 37 is joined to the rear end of the reinforcement 24, the stiffness of the reinforcement 24 may be increased, and accordingly torsional stiffness of the side sill 20 may be improved. Thus, in the event of a side impact of the vehicle, deformations of the side sill 20 and the center pillar may be significantly reduced.

An outboard-side rear reinforcing member 38 may be joined to the rear portion 24c of the reinforcement 24, and the outboard-side rear reinforcing member 38 may protrude from the rear portion 24c of the reinforcement 24 toward the exterior of the vehicle. The outboard-side rear reinforcing member 38 may have a bottom flange 38b. The bottom flange 38b of the outboard-side rear reinforcing member 38 may be joined to the bottom flange 24b of the reinforcement 24 by welding, using fasteners, and/or the like, and a portion of the outboard-side rear reinforcing member 38 may contact and be supported to the rear portion 24c of the reinforcement 24. The outboard-side rear reinforcing member 38 may be connected to a lower end portion of the rear portion of the outer side sill 21, and the outboard-side rear reinforcing member 38 may be connected to the wheel house extension portion 31 of the rear wheel house 30. As the outboard-side rear reinforcing member 38 connects the rear portion of the outer side sill 21, the rear portion of the reinforcement 24, and the wheel house extension portion 31 of the rear wheel house 30, a load applied to the rear portion of the outer side sill 21 may be transferred to the reinforcement 24, the wheel house extension portion 31, and the insert reinforcing member 37 through the outboard-side rear reinforcing member 38, and torsional stiffness of the outer side sill 21 may be improved.

For example, the outboard-side rear reinforcing member 38 may be made of a material having high stiffness which is the same as that of the outer side sill 21 or is higher than that of the outer side sill 21.

In the above-described configuration of the side sill structure, the reinforcement 24, the inner side sill 22, and the floor side member 27 may serve to maintain stiffness of the vehicle body and transfer an impact load. The outboard-side rear reinforcing member 38, the inboard-side rear reinforcing member 23, the wheel house extension portion 31, and the insert reinforcing member 37 may be connection members for making connections between adjacent components of the vehicle body, and serve as a path for load transfer. The connection member 35 and the outer side sill 21 may be main members supporting a wheel guard and a rear structure of the vehicle body.

When an impact load generated in the event of a side impact of the vehicle is applied to the rear portion of the outer side sill 21 of the side sill 20, the impact load applied to the outer side sill 21 may be transferred to the reinforcement 24, the wheel house extension portion 31, and the insert reinforcing member 37 through the outboard-side rear reinforcing member 38. The impact load may pass through the wheel house extension portion 31 and be transferred to the inboard-side rear reinforcing member 23, and then be transferred to the floor side member 27 and the floor 5. That is, after the impact load is evenly distributed from the rear portion of the side sill 20 through the reinforcement 24, the wheel house extension portion 31, the insert reinforcing member 37, and the inboard-side rear reinforcing member 23, it may be transferred to the floor side member 27 and the floor 5, and thus a survival space may be increased by 14% or more compared to the related art.

As set forth above, according to exemplary embodiments of the present disclosure, by increasing torsional stiffness of the side sills, deformation caused by an impact load such as a torsional load may be significantly reduced, and the impact load in the event of a side impact of the vehicle may be evenly distributed.

According to exemplary embodiments of the present disclosure, the reinforcement may extend from the front of the vehicle to the rear wheel house, and the rear portion of the reinforcement may be directly joined to the rear wheel house, and accordingly the torsional stiffness of the side sill may be improved. In the event of a side impact of the vehicle, the deformation of the rear portion of the side sill 20 may be significantly reduced, and thus the torsion of the side sill may be suppressed, and the impact load may be evenly distributed.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A side sill structure for a vehicle, the side sill structure comprising:
   a side sill connected to a floor of the vehicle, and extending in a longitudinal direction of the vehicle; and
   a rear wheel house connected to a rear end of the side sill,
   wherein the side sill includes an outer side sill facing an exterior of the vehicle, an inner side sill facing an interior of the vehicle, an inboard-side rear reinforcing member joined to a rear end of the inner side sill, and a reinforcement disposed between the outer side sill and the inboard-side rear reinforcing member,
   wherein the reinforcement extends from a front of the vehicle to the rear wheel house, and
   wherein a cross-section of the reinforcement is unchanged along a longitudinal direction of the reinforcement,
   wherein the rear wheel house includes a connection member joined to the rear end of the reinforcement,
   wherein the reinforcement includes a rear flange spaced apart from the connection member.

2. The side sill structure according to claim 1,
   wherein the reinforcement is joined to the inner side sill and the inboard-side rear reinforcing member.

3. The side sill structure according to claim 2, wherein the inner side sill and the inboard-side rear reinforcing member are joined to an edge of the floor.

4. The side sill structure according to claim 3, further comprising a floor side member joined to an inboard surface of the inboard-side rear reinforcing member, wherein the floor side member is disposed under the floor.

5. The side sill structure according to claim 2, wherein the rear wheel house has a wheel house extension portion to which the rear end of the side sill is joined,
   the wheel house extension portion is provided with a connection member having a shape matching that of a rear end of the reinforcement, and
   the rear end of the reinforcement is joined to the connection member.

6. The side sill structure according to claim 5, further comprising an insert reinforcing member inserted into the rear end of the reinforcement.

7. The side sill structure according to claim 6, wherein the insert reinforcing member is joined to the connection member through a structural adhesive.

8. The side sill structure according to claim 1, wherein the reinforcement has a top flange joined to the inboard-side rear reinforcing member.

9. The side sill structure according to claim 5, further comprising an outboard-side rear reinforcing member joined to a rear portion of the reinforcement,
   wherein the outboard-side rear reinforcing member protrudes from the reinforcement toward the exterior of the vehicle, and
   the outboard-side rear reinforcing member is connected to a rear portion of the outer side sill and the wheel house extension portion.

10. The side sill structure according to claim 9, wherein the reinforcement has a bottom flange joined to the inner side sill and the inboard-side rear reinforcing member, and the outboard-side rear reinforcing member has a bottom flange joined to the bottom flange of the reinforcement.

\* \* \* \* \*